US007693848B2

(12) United States Patent
Déjean et al.

(10) Patent No.: US 7,693,848 B2
(45) Date of Patent: Apr. 6, 2010

(54) METHOD AND APPARATUS FOR STRUCTURING DOCUMENTS BASED ON LAYOUT, CONTENT AND COLLECTION

(75) Inventors: Hervé Déjean, Grenoble (FR); Veronika Lux, Nancy (FR); Sandrine Ribeau, Paris (FR)

(73) Assignee: Xerox Corporation, Norwalk, CT (US)

( * ) Notice: Subject to any disclaimer, the term of this patent is extended or adjusted under 35 U.S.C. 154(b) by 211 days.

(21) Appl. No.: 11/033,016

(22) Filed: Jan. 10, 2005

(65) Prior Publication Data
US 2006/0155700 A1 Jul. 13, 2006

(51) Int. Cl.
*G06F 17/00* (2006.01)
*G06F 17/24* (2006.01)

(52) U.S. Cl. .................... 707/100; 715/242
(58) Field of Classification Search ............. 707/103 R, 707/103 Z, 200, 6, 100, 101, 102, 811, 790, 707/791, 803, 804; 715/234, 513, 500, 517, 715/523, 511, 512, 242
See application file for complete search history.

(56) References Cited

U.S. PATENT DOCUMENTS

| | | | | |
|---|---|---|---|---|
| 5,434,962 | A | | 7/1995 | Kyojima et al. ............. 395/145 |
| 5,491,628 | A | | 2/1996 | Wakayama et al. .... 364/419.08 |
| 5,893,109 | A | * | 4/1999 | DeRose et al. ............ 707/104.1 |
| 6,202,072 | B1 | * | 3/2001 | Kuwahara .................... 715/207 |
| 6,298,357 | B1 | | 10/2001 | Wexler et al. ............... 707/513 |
| 6,487,566 | B1 | | 11/2002 | Sundaresan ................. 707/513 |
| 6,490,603 | B1 | | 12/2002 | Keenan et al. .............. 707/513 |
| 7,047,488 | B2 | * | 5/2006 | Ingersoll et al. ............ 715/235 |
| 7,069,501 | B2 | * | 6/2006 | Kunitake et al. ............ 715/513 |
| 2001/0032218 | A1 | * | 10/2001 | Huang ........................ 707/513 |
| 2002/0143818 | A1 | | 10/2002 | Roberts et al. .............. 707/513 |
| 2002/0169770 | A1 | * | 11/2002 | Kim et al. ...................... 707/5 |
| 2003/0093760 | A1 | | 5/2003 | Suzuki et al. ............... 715/523 |
| 2003/0208502 | A1 | | 11/2003 | Lin ............................ 707/101 |
| 2004/0025117 | A1 | * | 2/2004 | Ingersoll et al. ............ 715/523 |
| 2004/0044659 | A1 | * | 3/2004 | Judd et al. ...................... 707/3 |
| 2004/0268236 | A1 | | 12/2004 | Chidlovskii et al. ......... 715/513 |
| 2005/0177784 | A1 | * | 8/2005 | Andrews et al. ............ 715/513 |
| 2006/0104511 | A1 | * | 5/2006 | Guo et al. ................... 382/176 |

OTHER PUBLICATIONS

Adler, S., et al., "Extensible stylesheet language (XSL), Version 1.0," W3C 2001, http://www.w3.org/TR/2001/REC-xsl-20011015/.

(Continued)

*Primary Examiner*—Hung T Vy
(74) *Attorney, Agent, or Firm*—Fay Sharpe LLP

(57) ABSTRACT

A method and apparatus is provided for converting a document in a first format essentially comprising a flat layout structure into a structured document in a hierarchical form in accordance with predetermined attributes identified from the input format. The process comprises fragmenting the input document into a plurality of document content elements in accordance with a predetermined set of document attributes identifiable from the input document format. The content elements are clustered into selective sets having similar document attributes. The clustered sets are validated with reference to common textual properties organizational content common in documents in the collection. The clustered sets are then categorized into predetermined categories comprising structured elements of the structured document format and the document content elements are organized by hierarchical dependency from the predetermined categories wherein the organized document elements comprise the desired structured document format.

16 Claims, 2 Drawing Sheets

OTHER PUBLICATIONS

Figure 1:
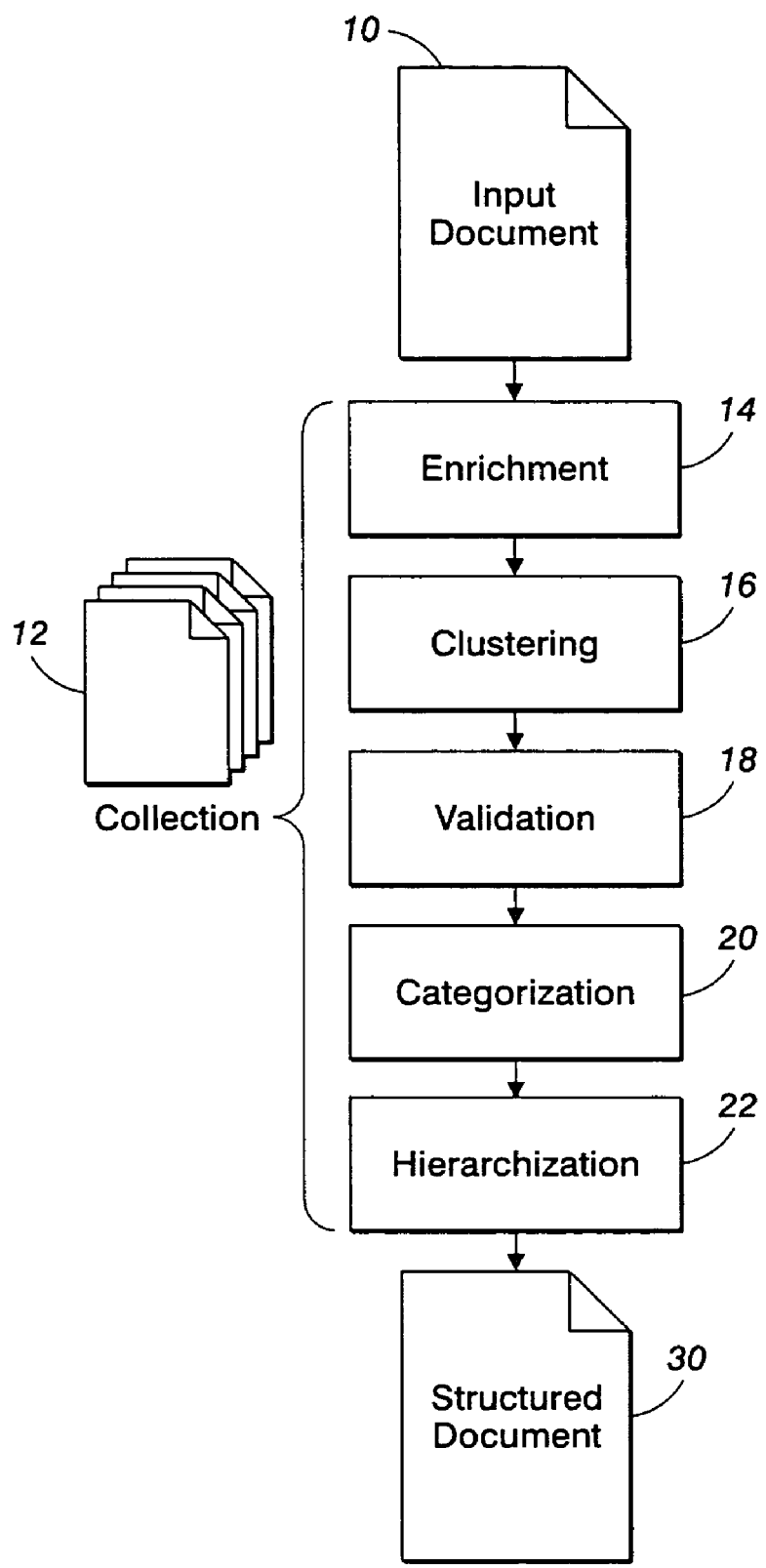

Aiello, M., Monz, C., Todoran, L., Worring, M., "Document understanding for a broad class of documents", International Journal on Document Analysis and Recognition (IJDAR), vol. 5, 2002, Springer-Verlag, pp. 1-16.

Anjewierden, A., "AIDAS: Incremental logical structural discovery in PDF documents", Proceedings of the International Conference on Document Analysis and Recognition (ICDAR), Seattle, 2001.

Belaïd, A., Pierron, L., Valverde, N., "Part-of-speech tagging for table of contents recognition", International Conference on Pattern Recognition (ICPR 2000), vol. 4, Sep. 3-8, 2000 Barcelona, Spain.

Dori, D., Doermann, D., Shin, C., Haralick, R., Phillips, I., Buchman, M., Ross, D., "The representation of document structure: A generic object-process analysis", Chapter XX, *Handbook on Optical Character Recognition and Document Image Analysis*, World Scientific Publishing Company, 1995/1996, pp. 000-000.

Dori, D., Doermann, D., Shin, C., Haralick, R., Phillips, I., Buchman, M., Ross, D., "The representation of document structure: A generic object-process analysis", Chapter 16, *Handbook of Character Recognition and Document Image Analysis*, World Scientific Publishing Company, 1997, pp. 421-456.

Klink, S., Dengel, A., Kieninger, T., "Document structure analysis based on layout and textual features", Pcroceedings of Fourth IAPR International Workshop on Document Analysis Systems, DAS 2000, Rio de Janeiro, Brazil, 2000, pp. 99-111.

Lin, C.C., Niwa, Y., Narita, S., "Logical structure analysis of book document images using contents of information", 4$^{th}$ International Conference on Document Analysis and Recognition (ICDAR'97), Ulm, Germany, Aug. 1997, pp. 1048, 1054.

Lin, X., "Header and footer extraction by page-association", Hewlett-Packard Company Technical Report, 2002, www.hpl.hp.com/techreports/2002/hpl-2002-129.pdf.

Lin, X., "Text-mining based journal splitting", Proceedings of the Seventh International Conference on Document Analysis and Recognition (ICDAR 2003), vol. II, Aug. 3-6, 2003, Edinburgh, Scotland.

Lin, X., Simske, S., "Automatic document navigation for digital content re-mastering", SPIE COnference on Document Recognition and Retrieval XI, Jan. 18-22, 2004, San Jose, CA.

Power, R., Scott, D., Bouayad-Agha, N., "Document Structure", Computational Linguistics, vol. 29, No. 2, 2003, pp. 211-260.

Satoh, S., Takasu, A., Katsura, E., "An automated generation of electronic library based on document image understanding", Proceedings of the Third International Conference on Document Analysis and Recognition (ICDAR'95), vol. 1, Aug. 14-15, 1995, Tokyo, Japan, pp. 163-166.

Summers, K.M., "Automatic discovery of logical document structure", PhD thesis, Cornell University, Computer Science Department, Aug. 1998, pp. 1-181.

Virk, R., "Converting PDF files into XML", *CambridgeDocs*, 2004, www.cambridgedocs.com.

U.S. Appl. No. 11/032,814, filed Jan. 10, 2005, Herve Dejean et al.

U.S. Appl. No. 11/032,817, filed Jan. 10, 2005, Herve Dejean et al.

Han, W. et al., "Wrapping Web Data Into XML", SIGMOD Record, New York, NY, vol. 30, No. 3, Sep. 2001, pp. 33-38, XP009016073 ISSN: 0163-5808.

Ouahid, H., et al. "Converting Web Pages into Well-formed XML Documents," 1999 IEEE International Conference on Communications; Vancouver, CA, Jun. 6-10, 1999, IEEE, US, vol. 1, Jun. 6, 1999, pp. 676-680.

\* cited by examiner

METHOD AND APPARATUS FOR STRUCTURING DOCUMENTS BASED ON LAYOUT, CONTENT AND COLLECTION

BACKGROUND

The following relates to the information storage and processing arts. It finds application in conjunction with electronic document format conversion and in particular with cataloging of legacy documents in a marked-up format such as extensible markup language (XML), standard generalized markup language (SGML), hypertext markup language (HTML), or the like, and will be described with particular reference thereto. However, it is to be appreciated that the following is amenable to other like applications.

More than ever, documents are now central in many activities. Knowledge is stored in documents and knowledgeable exchange is performed by circulating those documents. In this context, the recent evolution toward "structured documents" (especially around the W3C XML language format) as an effort to endow documents with new properties will continue to ease the automatic processing of the documents.

Legacy document conversion relates to converting unstructured documents existing in formats such as Adobe® portable document format (PDF), various text formats, various word processing formats, and the like into structured documents employing a markup language such as XML, SGML, HTML, and the like. In structured documents, content is organized into delineated sections such as document pages with suitable headers/footers and so forth. Alternatively, other kinds of segmentable text blocks can be identified. Such organization typically is implemented using markup tags. In some structured document formats such as XML, a document type definition (DTD) or similar document portion provides overall information about the document, such as an identification of the sections, and facilitates complex document structures such as nested sections.

There is thus interest in converting unstructured documents to a structured format when such structure can facilitate storage and access of this document as a "legacy document". The particular motivations for converting documents are diverse, typically including intent to reuse or repurpose parts of the documents, desire for document uniformity across a database of information store, facilitating document searches, and so forth. Technical manuals, user manuals and other proprietary reference documents are common candidates for such legacy conversions.

A particular problematic issue that arises during the conversion process is the rebuilding or preserving of structural information. The output structure can be very different from the input structure and depending on what one wants to do with a document, a different structure may be needed. For example, a layout-oriented structure allows publishing a document on different media but would not very much help semantic search or automatic summarization, and page segmentation is often discarded in a logical representation, where logical units are elements such as chapters and sections (pages are usually considered as a physical element and do not appear).

The "document understanding" or "document analysis" research field precisely aims at analyzing a presentation-oriented document representations to build some more abstract document structures. It is a very heterogeneous field since different disciplines, such as image processing (OCR, document page layout analysis) and Natural Language Processing aim at analyzing documents. Each of these disciplines has its particular view point and vocabulary and there is not yet anything like a shared understanding of what "presentation-oriented", "logical" or "content-oriented" structures might be. Nevertheless, there is a shared working hypothesis about their interdependency. (Marco Aiello, Christof Monz, Leon Todoran, and Marcel Worring, Document understanding for a broad class of documents. *International Journal of Document Analysis and Recognition,* 5:1-16, 2002. Richard Power, Donia Scott, and Nadget Bouayad-Aga. Document Structure. *Computational Linguistics,* 29(2):211-260, 2003.)

Thus there is a need for transforming a document (more precisely, documents comprising a homogeneous collection) with a layout-oriented structure into a document with a more abstract generic structure hereinafter identified as a "logical structure". The logical structure can then be used as an intermediary step toward a content-oriented structure, more specific to a particular document or document collection. Such a system would be particularly advantageous if the "presentation-oriented", "logical" and "content-oriented" structures could be related, i.e., by using both knowledge of the layout and knowledge of the content to reach the desirably structured document. Additionally, it would also be advantageous if information related to the document could be computed at the collection level.

For purposes of this application, "layout" is intended to include the physical presentation of a document including segmenting constructs such as chapters, sections, pages, tables and appendices. By "content", it is intended to comprise the textual material itself within the document. By "collection", it is intended to mean a related or homogeneous associated set of documents, e.g., a collection of technical manuals relating to a particular product line.

Copending, commonly assigned applications comprise a Method and Apparatus for Detecting a Table of Contents and Reference Determination Ser. No. 11/032,814; Method and Apparatus for Detecting Pagination Constructs Including A Header and A Footer In Legacy Documents Ser. No. 11/032, 817; and Systems and Methods for Converting Legacy and Projecting Documents Into Extended Markup Language Format, (Ser. No. 10/756,313, filed Jan. 14, 2004), which are herein incorporated by reference.

The following provides improved apparatuses and methods that overcome the above-mentioned disadvantages and others to provide structuring documents based on their content, layout and collection.

BRIEF DESCRIPTION

The systems and methods according to this invention convert legacy and proprietary documents in a first layout-oriented structural format into an extended markup language format having a more abstract generic structure, i.e., "logical structure". In the exemplary embodiments, the document is preferably part of a homogeneous collection. The conversion involves transforming the layout-oriented structure into ordered trees of a model wherein the tree content elements are organized by hierarchical dependency in accordance with predetermined categories representative of the document content elements in a logical structure.

The process structure comprises selective structuring processes including fragmenting the document from its initial layout structure into a plurality of document content elements in accordance with a predetermined set of document attributes identifiable from the initial document format. Selective sets of the fragmented content elements are clustered in accordance with similar attributes. The clustered sets are validated with reference to common textual properties in organizational content of documents within the homogeneous collection. The clustered sets are then categorized into predetermined categories comprising desired structured elements of the logical structure document format. The document format elements are then organized by hierarchal dependency from the predetermined categories wherein the organized document elements comprise the desired logical structure.

In various embodiments, the fragmenting comprises forming the document content elements of the logical structure as a text block, selectively including an optional head, a body and an optional tail. Language format tags are attached indicative of the text block.

The organizing also includes assigning hierarchical level attributes to the fragmented document elements. The fragment elements are assigned relative nested positions in accordance with the hierarchical level attributes whereby the nested relative positions form the desired ordered tree model.

Alternatively, the document content elements can be further enriched with additional attributes derived from initial layout structure format, such as capital letters, text, length of textual content, selected linguistic content and saliency.

An apparatus is disclosed to implement the aforementioned structuring processes.

DRAWING DESCRIPTIONS

Figure 2:
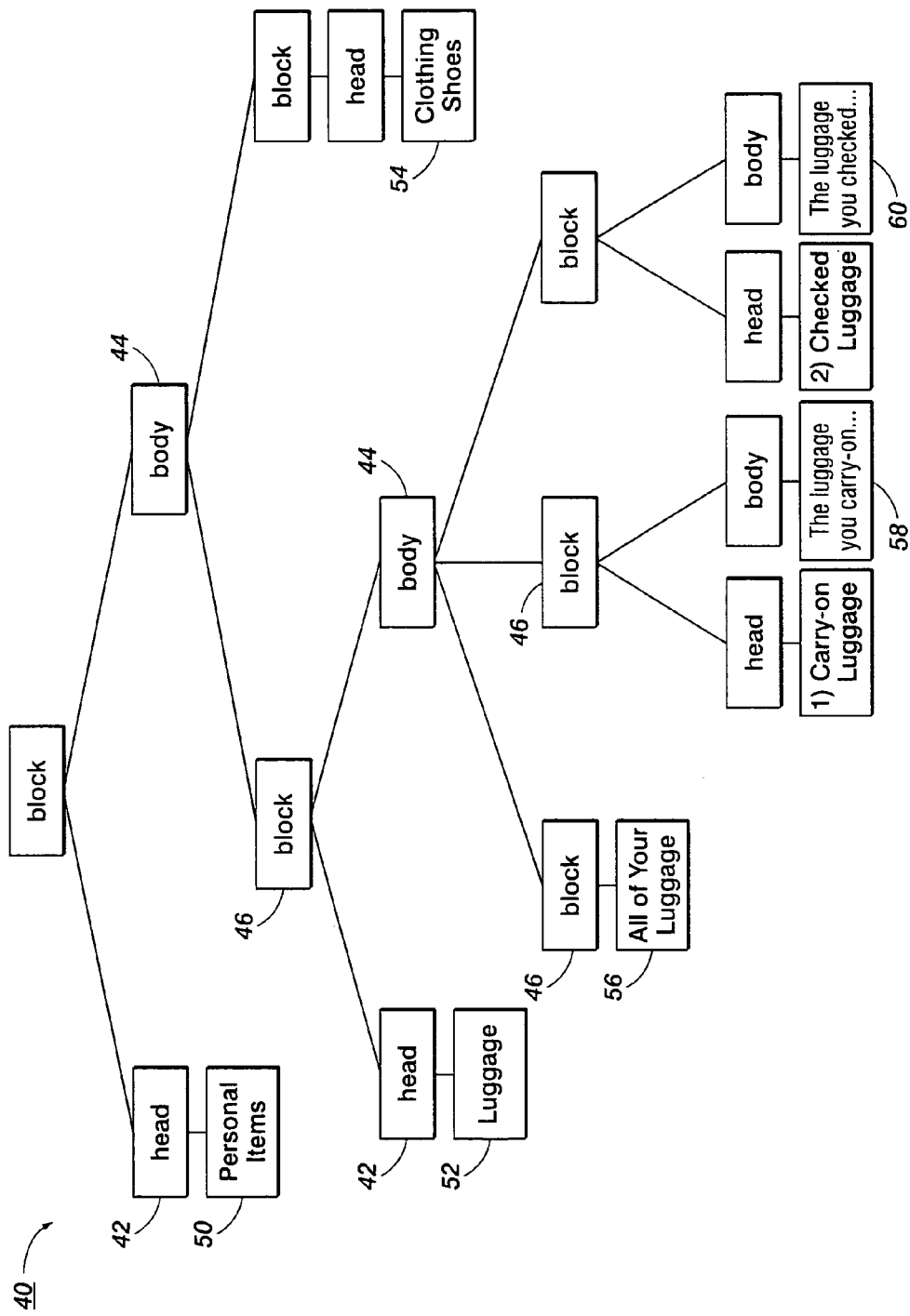

FIG. 1 is flowchart block diagram of the processes for transforming an input document into a desired structure document; and FIG. 2 is an organized hierarchical tree model of an excerpt of the logical structure format of a desired document format.

DETAILED DESCRIPTION

With reference to FIG. 1, the initial structure of the input document 10 reflects the document layout (e.g., W3C XSL-FO, Extended Stylesheet Language, cf. www.w3.org/Style/XSL). The initial structure is an XML vocabulary for specifying formatting semantics, as is commonly known in the art. The desired converted logical structure of the structured document 30 will reflect a more abstract structure organized in accordance with the input document layout content and collection for enhanced ease of access and storage in a legacy document collection (e.g., an XML DTD).

A representation of the generic logical structure as intended for the structured document is as follows:

TABLE 1

| <! ELEMENT | Block | (Head?, Body, Tail?)> |
| <! ELEMENT | Head | (#PCDATA \| BLOCK)> |
| <! ELEMENT | Tail | (#PCDATA \| BLOCK)> |
| <! ELEMENT | Body | (#PCDATA \| BLOCK)> |
| <! ATTRLIST | Head Level | #IDREF> |
| <! ATTRLIST | Tail Level | #IDREF> |
| <! ATTRLIST | Body Level | #IDREF> |

Use of such a logical structure for the document structure analysis provides advantageous access and use of a structured document 30 in a legacy collection. Such a logical structure is generic enough for different kinds of document collections, and is applicable at all the hierarchical levels of the document (from high levels such as chapters, to low levels such as lists).

FIG. 2 is an example of a portion of a document so structured in a desired DTD comprising a tree model logical structure. For mere purposes of example, the subject processes will be explained with reference to documents of a collection 12 comprising travel guides.

With particular reference to FIG. 2, a logical portion of the document 10 is composed of an optional head 42, a body 44 and an optional tail (not shown). Each such element is recursive and contains either text or a block. The relative position of the block within the structured tree model can be defined by a level attribute associated as a format tag in order to identify the hierarchical position of the element. Normally, the heads 42 will correspond to titles of a document, chapters, sections, etc. For example, a book is composed of a head (everything from the beginning of the book to the beginning of the first chapter), a body (sequence of chapters), and a tail (everything from the end of the last chapter to the end of the book). Each head, body and tail can then be also structured as is shown in FIG. 2.

Continuing with the example of the travel guide of FIG. 2, if a certain chapter of the travel guide were concerned with personal travel items 50, then it may have a section on handling luggage 52 and the recommended travel wear (clothing, shoes) 54. The luggage itself can then be further organized into whether the luggage is all types 56 or travels with the traveler as checked or carry-on luggage 58, 60.

Accordingly, what is layout oriented as a mere descriptive textual paragraph suggesting helpful travel guidelines can be reformatted into a logical structure much more easily accessible by subject matter or attribute within a legacy document collection.

With continued references to the FIGURES, the objective of the processing for implementing the desired conversion comprises converting a layout document comprising a listing of content elements (a flat tree) into a deeper tree that reflects the logical structure of the document in which a tree model is compliant with a desired generic DTD.

In the subject embodiments, documents have been coded in an XSL-FO format so that the initial text block or element list is composed by fragmenting the document into a plurality of document content elements conventionally tagged as document blocks in XSL-FO. However, other input formats are just as applicable to the present process (HTML, PDF files converted into XML). The subject processes are thus applicable to any input document containing information about its layout that can be converted into XML. The following comprises an exemplary list of the attributes for a particular element provided by XSL-FO for encoding the layout information:

TABLE 2

<fo: block keep-with-next.within-column="always"
   line-height="12.5pt" margin-left="0.0pt"
   margin-right=0.0pt" orphans="2"
   space-after="6.0pt"
   space-before="0.0pt" text-align="justify"
   text-indent=0.0pt"
   white-space-collapse+"false" widows="2">
<fo: inline font-family="Comic
   Sans MS, cursive"
   font-size-"11.0pt"
   text-decoration="underline">
LUGGAGE
</fo:inline>
</fo:block>

In this example, the structuring process is generic because the semantics of the initial element and attribute names are not employed. It is not necessary to try to put a priori semantics in the layout attributes. For example, it is not necessary to consider that centered and bold elements are certainly titles. On the other hand, one of the more important fragmenting bases is saliency (i.e., if two contiguous elements do not share most of their attributes, then they likely belong to two different kinds of logical elements.) Such fragmenting by documenting attributes identifiable from the input document format facilitates distinguishing a head from its body (i.e., a section title from its body), whatever the layout attributes of the head are. The basic operation of the fragmenting thus comprises a comparison between the attribute sets of two elements (mainly for clustering similar elements as will be explained below). Such an approach which does not use attributes semantics explicitly allows the development of heuristics for structuring documents that apply to any selected collection of documents.

With particular reference FIG. 1, the conversion process gradually converts the initial flat structure of the input document into the target structure of the structured document, with the following structuring processes:

1. Element enrichment 14 with new attributes.
2. Element clustering 16 based on similarity between the attribute set of different elements.
3. Cluster validation 18 using collection and content information.
4. Cluster categorization 20 into the three logical categories (Head, Block, or Tail).
5. Element structuring 22 by adding new logical levels of hierarchy into the document.

These steps are iteratively applied to the documents of the document collection 12 until the categorization processes 20 do not identify new hierarchical elements. The output of this algorithm is the structured document 30 collection compliant with the target DTD.

The details of the conversion process are as follows.

Any preprocessing extracts the XSL-FO elements labeled "block" (see Table 2 above) corresponding to the elements containing the textual parts of the document. The attributes of the "inline" elements of each block, are copied at the block level. Accordingly, the processes of FIG. 1 are employed only at the block level.

Enrichment 14 process involves selectively adding new characteristic properties for the textual elements of the input document 10. The elements can be preferably enriched with new attributes whose value is automatically computed. Such new attributes may selectively comprise a layout characteristic element that is not explicit in XSL-FO. In particular, attributes are added to text blocks whose PCDATA is written in capital letters only. Additionally, at least for documents written in English, the fact that each work in a PCDATA begins with a capital is also a useful characteristic. Another enriching attribute is the length (number of characters) of the PCDATA content of an element. In addition, results of linguistic content analysis can also be added as enriching attributes. Lastly, saliency can be computed for each element of the document.

The clustering 16 process comprises aggregating by attribute similarity the homogeneous elements of the fragmented document. Elements can be clustered using all the attributes provided by XSL-FO, and some of the new attributes added during the enrichment 14. Since the semantic of the attributes are known, selection of desired ones may be taken into account during the clustering. The resulting textual elements that are clustered during the clustering 16 will provide homogenous clusters corresponding to the desired target elements. Each cluster should contain elements belonging to the same possible category: head 42, body 44 and tail of the same level. The table below shows the clustering of the elements of the document logically structured in FIG. 2:

TABLE 3

| Cluster | Elements |
|---|---|
| 1 | Luggage |
| | Clothing shoes |
| 2 | 1/carry-on baggage |
| | 2/checked baggage |
| 3 | The luggage you carried on . . . |
| | The luggage you checked . . . |
| 4 | PERSONAL ITEMS |
| 5 | all types of luggage |

The clustering of document elements by attribute similarities should result in clusters that are common or shared across all the documents of the homogeneous collection. The clusters thus provide a gathering of the same elements, (i.e., elements having the same textual contents) to broaden the clustering into as broad a base as possible. In other words, it is expected that for the conversion of textual manuals, such as car user manuals, clusters tagged by certain manual section headings will be the same text (e.g., the same titles) for all the different car manuals in the collection.

Thus, the collection can be used for validating 18 (or possibly correcting) the clustering by content analysis of the documents of the collection. Verification by identical textual content is one way to validate the cluster formations. Unfortunately, it is common that often times other levels of structuring may use titles which are systematically different for different documents of the collection. For example, in the same subject matter travel descriptions, the main title may be different, so that not all clusters can be validated this way, but where such validation processes are available, they are useful to employ.

Clustering validation can also be implemented by content analysis of the textual form of the text block elements. For example, content patterns that are particularly associated with a section numbering in a manual can be used for helping to validate a cluster made of the content elements. Continuing the example, if a particular section number were missing, the conversion process could possibly look elsewhere for the misclassified or improperly clustered section. It should be noted that merely using a pattern that describes a document section numbering is not new in itself. What is important is that it should be appreciated that the use of content of the elements of a cluster can be available for validating so that the ordered elements of a particular cluster are at the same or appropriate level for the structured document format. For example, patterns that describe block numbering help validate a cluster made of the elements:

| | |
|---|---|
| 80 | Battery |
| 81 | Light |
| 82 | Anti-starting |
| 83 | Instrument board |
| 85 | Wipers |
| 86 | Wiring |

In the foregoing, element 84 is missing and could suggest a search for it elsewhere.

Cluster categorization 20 is the next processing step in the conversions. Once a set of clusters is generated, the clusters must be categorized into three possible categories suggested by the target DTD: head 42, body 44 or tail. The categorization 20 is based upon generic knowledge about each category. Saliency is particularly useful as a basis for categorization. As noted above, the saliency of a particular textual element in a document corresponds to the difference (in terms of attributes) between itself and its immediate preceding and following neighbors. This can be mathematically expressed as:

$$sal(x_i) = diff(x_i, x_{i-1}) + diff(x_i, x_{i+1}) \qquad (1)$$

$$diff(x, y) = \frac{|attr(x) - (attr(x) \cap attr(y))|}{|attr(x)|} \qquad (2)$$

where attr(x) is the set of attributes of the element x. Saliency is used in order to characterize head elements. Elements with a high saliency usually correspond to head/tail of the structure. The cluster saliency is the mean of the saliency of each cluster element. In practice, only the cluster with the highest saliency is categorized, which is enough for structuring the document.

Other criteria (positive as well as negative) can be used for categorizing 20. These include the position of the elements; if an element occurs at the end of the list, it cannot be a head; if the element occurs in the table of contents (certainly a head); if the element occurs first in the list (certainly a head); and, if two elements within the cluster are contiguous (certainly a part of the body). Combinations of any of these criteria can also be used to correctly categorize the content elements.

The last process in the conversion structuring is hierarchization 22 to form the tree model as shown in FIG. 2 comprising a plurality of hierarchical levels, wherein each level is added at a structuring process iteration. In other words, the structuring process to effect the conversion is top-down and iterative. At each iteration, a list of document content elements is presented (initially the list of all the pre-processed blocks of the document), where the heads 42 are marked up (i.e., the elements of the cluster with the highest saliency). For each head 42 a new block 46 is added with its substructure; head 42 and body 44. The bodies 44 are composed of document elements between two heads of the same cluster/level. This transformation is illustrated in FIG. 2. Each new body 44 is processed for the very next iteration, until no new head can be found. Thus, after the entire document has been processed to form the structured document 30, a tree model 40 of the type illustrated in FIG. 2 will comprise a structured representation of the entire document. Such a structure format 30 comprising a legacy format, comprise an improved stored form of the document providing enhanced usefulness in access and reference than could be obtained with the layout structure of the input document 10.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A computer-implemented method for unsupervised structuring of a plurality of legacy documents comprising a part of a homogeneous collection from a common input document format reflecting a layout text lacking language mark-up tags to a structured document format employing language mark-up tags and more useful for document structure analyses comprising:

using a computer processor, inputting the documents via an input device into a computer module for processing;

fragmenting the input documents into a plurality of document content elements in accordance with a predetermined set of document attributes identifiable from the input document format wherein the attributes comprise language mark-up format tags identifying hierarchical positions of the context elements;

clustering selective sets of the content elements having document attribute similarities comprising the language mark-up format tags;

validating the clustered sets with reference to common textual properties and organizational content within the collection by analysis of textual content or form of the content elements, wherein the textual content or form of the documents validate the clustering by identity of text or order for avoiding human-supervised validating of the clustering;

categorizing the clustered sets into predetermined categories comprising structured elements of the structured document format; and organizing the document content elements by hierarchical dependency from the predetermined categories, wherein the organized document elements comprise the desired structured document format wherein the clustering and categorizing is automatically effected for any type of legacy document within the collection;

wherein the fragmenting comprises forming the document content elements as a recursive block, where the recursive block comprises a body, an optional head, and an optional tail, and where the body, optional head and optional tail contain either text or another recursive block.

2. The method as described in claim 1 wherein the organizing comprises assigning hierarchical level attributes to the fragmented document elements.

3. The method as described in claim 2 wherein the organizing further includes assigning relative nested positions to the fragmented elements in accordance with the hierarchical level attributes, and wherein the nested relative positions comprise the desired structured document format.

4. The method as described in claim 1 further including enriching the document content elements with additional attributes derived from the input document format.

5. The method as described in claim 4 wherein the additional attributes include text in capital letters only, text having words beginning in capital letters, length of textual content of an element, selective linguistic content and saliency.

6. The method as described in claim 4, wherein the additional attributes include saliency, where saliency is calculated based at least partially on the similarity between the attributes of two contiguous document content elements.

7. The method as described in claim 1, wherein the text of the optional head, body and optional tail comprises parsed character data (PCDATA).

8. The method as described in claim 1, wherein the recursive block comprises a body, an optional head, and an optional tail, and where the body, optional head and optional tail contain at least one of text and a plurality of recursive blocks.

9. The method as described in claim 1, wherein
the optional head of the recursive block corresponds to at least one of the following:
a title,
a section heading, and
a section of the document starting at the beginning of the recursive block and ending at the beginning of the body of the recursive block;
the body of the recursive block corresponds to at least one of the following:

a section of the document related to the content of the corresponding optional head, a section of the document containing common content, and a sequence of at least one chapter; and the optional tail of the recursive block corresponds to a section of the document starting at the end of the body, and ending at the end of the recursive block.

10. An apparatus for systematically converting a document in a first input format reflecting a layout text lacking language mark-up tags to a second structured format employing language mark-up tags useful for structured format analyses and legacy document storage, comprising:

a shared bus;

a computer processor implemented fragment processing module, connected to the shared bus, for fragmenting the document into a recursive block structure identifiable from the first input format by attributes corresponding to the text fragments, wherein the attributes comprise language mark-up format tags identifying hierarchical positions of the text fragments, wherein the recursive block structure comprises a body, an optional head, and an optional tail, where the head, optional body and optional tail contain either text or another recursive block structure;

a computer processor implemented cluster processing module, connected to the shared bus, for associating selected sets of the text fragments wherein the sets have selective common attributes comprising the language mark-up format tags, respectively;

a computer processor implemented validator, connected to the shared bus, for verifying the associating with reference to a third set of documents comprising a homogeneous collection including the document by analysis of the textual content or form of the selected sets, wherein the textual content or form of the documents validate the clustering by identity of text or order for avoiding human-supervised validating of the clustering;

a computer processor implemented categorizing module, connected to the shared bus, for categorizing the selected sets into predetermined categories comprising structured elements of the second structured format; and, a computer processor implemented organizer, connected to the shared bus, for organizing the text fragments by hierarchical dependency from the predetermined categories, whereby the organized text fragments comprise the second structured format.

11. The apparatus as defined in claim 10 further including an enriching processor for enriching the text fragments with additional attributes derived from the first input format.

12. The apparatus as described in claim 11 wherein the additional attributes comprise text in capital letters only, text having words beginning in capital letters, length of textual content of an element, and selective linguistic content.

13. The apparatus as described in claim 11 wherein the cluster processor uses selected ones of the cluster attributes and the additional attributes as a basis for the associating of the text fragments.

14. The apparatus as described in claim 10 wherein the hierarchical dependency comprises relative nested positions of the text fragments.

15. The apparatus as described in claim 11, wherein the additional attributes comprise saliency, where saliency is calculated based at least partially on the similarity between the attributes of two contiguous document content elements.

16. The apparatus as described in claim 10, wherein the optional head of the recursive block corresponds to at least one of the following:

a title, a section heading, and a section of the document starting at the beginning of the recursive block and ending at the beginning of the body of the recursive block;

the body of the recursive block corresponds to at least one of the following:

a section of the document related to the content of the corresponding optional head, a section of the document containing common content, and a sequence of at least one chapter; and the optional tail of the recursive block corresponds to a section of the document starting at the end of the body, and ending at the end of the recursive block.

* * * * *